(12) United States Patent
Zhang et al.

(10) Patent No.: US 10,445,461 B2
(45) Date of Patent: Oct. 15, 2019

(54) PROCESS VARIATION-AWARE SIZING-INCLUSIVE ANALOG LAYOUT RETARGETING WITH OPTICAL PROXIMITY CORRECTION

(71) Applicants: Lihong Zhang, St. John's (CA); Xuan Dong, St. John's (CA)

(72) Inventors: Lihong Zhang, St. John's (CA); Xuan Dong, St. John's (CA)

(*) Notice: Subject to any disclaimer, the term of this patent is extended or adjusted under 35 U.S.C. 154(b) by 105 days.

(21) Appl. No.: 15/848,736

(22) Filed: Dec. 20, 2017

(65) Prior Publication Data

US 2019/0188356 A1 Jun. 20, 2019

(51) Int. Cl.
*G06F 17/50* (2006.01)

(52) U.S. Cl.
CPC ...... *G06F 17/5081* (2013.01); *G06F 17/5009* (2013.01)

(58) Field of Classification Search
CPC .................. G06F 17/5081; G06F 17/5009
USPC ......................................................... 716/111
See application file for complete search history.

(56) References Cited

U.S. PATENT DOCUMENTS

| | | | | |
|---|---|---|---|---|
| 6,477,683 B1 * | 11/2002 | Killian | ................ | G06F 17/5045 716/104 |
| 8,806,414 B2 * | 8/2014 | Huang | ................ | G06F 17/5081 716/106 |
| 2011/0161907 A1 * | 6/2011 | Cheng | ................ | G06F 17/5081 716/119 |

(Continued)

OTHER PUBLICATIONS

Antreich, K., Eckmueller, J., Graeb, H., Pronath, M., Schenkel, F., Schwencker R., and Zizala S. 2000. WiCkeD: Analog Circuit Synthesis Incorporating Mismatch. In Proc. IEEE Custom Integrated Circuits Conference, pp. 217-220.

(Continued)

*Primary Examiner* — Suchin Parihar
(74) *Attorney, Agent, or Firm* — Hill & Schumacher

(57) ABSTRACT

The present disclosure provides a method to maximize the overall chip yield. This method combines a PV-aware deterministic circuit sizing process with a hybrid OPC operation, and integrates them into an analog layout migration platform, which attempts to efficiently compose a layout by inheriting knowledge from a legacy layout and imposing new specifications, circuit sizing and constraints. The present method provides a sizing process, which explores robust circuit sizes under different PV conditions, especially considering mismatch effects on sensitive analog devices. The analog layout migration is conducted along the sizing flow for efficient layout synthesis with a unique benefit to better evaluation of the PV-related post-layout effects. After finishing the sizing process, a hybrid OPC operation, which adopts global rule-based OPC and local model-based OPC along with the PV-band shifting, is performed as a post-processing step. Thereafter, a target mask layout is created with fast processing time, high wafer image fidelity, low mask complexity, and robust circuit performance under PV conditions. This present method provides an efficient solution to layout synthesis with respect to analog ICs by combining the deterministic sizing process with fast analog layout migration and hybrid OPC operations.

30 Claims, 5 Drawing Sheets

(56) References Cited

U.S. PATENT DOCUMENTS

2013/0326447 A1* 12/2013 Huang ................ G06F 17/5081
716/112

OTHER PUBLICATIONS

Schwencker, R., Schenkel, F., Graeb, H., and Antreich, K. 2000. The Generalized Boundary Curve-A Common Method for Automatic Nominal Design and Design Centering of Analog Circuits. In Proc. Design, Automation and Test in Europe Conference and Exhibition, pp. 718-723.
Liu, Z. and Zhang, L. 2010. A Performance-Constrained Template-Based Layout Retargeting Algorithm for Analog Integrated Circuits. In Proc. 15th Asia and South Pacific Design Automation Conference, pp. 293-298.
Pombacher, F. 1989. A New Method Supporting the Nominal Design of Analog Integrated Circuits with Regard to Constraints. In Proc. European Conference on Circuit Theory and Design, pp. 614-618.
Ma, X. and Arce, G. R. 2010. Computational Lithography, John Wiley & Sons, Inc., Hoboken, New Jersey, pp. 1-226.
Fakhry, M., Maaty, H., and Seoud, A. 2009. Introducing Process Variability Score for Process Window OPC. In Proc. SPIE 7488, 748836, pp. 1-10.

* cited by examiner

PROCESS VARIATION-AWARE SIZING-INCLUSIVE ANALOG LAYOUT RETARGETING WITH OPTICAL PROXIMITY CORRECTION

FIELD OF THE DISCLOSURE

This disclosure relates to a process variation (PV) aware deterministic-sizing process integrated into an analog layout retargeting platform that is used to finely tune sensitive analog devices to be robust under PV-induced mismatch conditions, while the layout retargeting platform serves as an efficient layout synthesis tool with the capability of optical proximity correction.

BACKGROUND

With the development of a series of resolution enhancement techniques (RETs), such as optical proximity correction (OPC) and multiple patterning, wafer pattern distortions during lithography process can be effectively alleviated in the advanced nanometer technologies. However, due to process variation (PV) in the lithography process, such as dosage error and defocus, deviation of critical circuit features may occur under different PV conditions. Especially in analog integrated circuits (ICs), such deviation might introduce device mismatch on sensitive analog blocks, and in turn degrade circuit performance.

Conventional PV-aware OPC methods [Su et al. 2016] attempted to shrink the possible wafer image range under PV conditions. In the literature, most of the existing studies on OPC are only focused on digital IC layouts, which are usually more compact compared to the analog counterpart. Those digital OPC solutions, which are fairly general for fixing pattern distortions, can hardly be applied to a complex mixed-signal IC chip enclosing high-performance analog blocks. Therefore, a unique OPC solution to analog layouts with specific optimization objectives and higher efficiency is demanded due to the following particularity of analog layouts: 1) various pattern manipulation can be performed by leveraging the available space within analog layouts; 2) mismatch effects induced under PV conditions may have stronger negative impact on analog layout constraints, such as matching and symmetry, which require dedicated handling; and 3) pattern distortions may readily change device sizes that actually dominantly determine the analog circuit performance. Therefore, a standalone generic OPC process may not be sufficient for analog circuit performance preservation. In this context, a circuit sizing method along with proper PV considerations would be highly essential to reduce the analog circuit vulnerability to mismatch effects.

Evolutionary algorithm (EA) is a popular circuit sizing scheme, which attempts to find the global optimal circuit sizes by inheriting elite genes from previous generations. Due to its mutation and crossover strategies, EA presents a superior ability of escaping from local optimal points in the highly non-linear solution space. However, the EA-based sizing method is very time-consuming because it usually requires large population and generation sizes. Especially when post-layout effects, e.g., PV-aware pattern distortions, are considered during the calculation of sizing fitness, a layout synthesis has to be performed on each individual within each population, which may significantly degrade the algorithmic efficiency. Compared to the stochastic EA-based sizing approaches, Antreich et al. [2000] proposed a deterministic circuit sizing algorithm, which can solve the sizing problem much faster. With appropriate linearized approximations, this algorithm explores the solution space along a specific direction based on circuit performance gradients in order to reach an optimal set of circuit sizes. As long as a reasonably suitable initial sizing solution is available, this deterministic sizing method would converge quickly, which can offer high efficiency and applicability even when the time-consuming layout synthesis is required for post-layout effect considerations during the sizing process.

Analog layout synthesis, such as analog layout retargeting, acts as a bridge between pre-layout circuit design stage and post-layout effects. By using an effective layout synthesis scheme, the circuit sizing algorithms can thoughtfully handle the post-layout effects and in turn benefit the chip yield. Since both circuit sizing and layout synthesis might be slow processes, the combination of the deterministic circuit sizing algorithm and the layout retargeting platform could be a good candidate for lithography-aware optimizations. As Liu and Zhang [2010] proposed, a graph-based analog layout retargeting approach can quickly compose a target layout by inheriting knowledge from a legacy layout and also imposing new circuit sizes, constraints and specifications.

SUMMARY

The present disclosure provides a PV-aware deterministic-sizing process integrated into an analog layout retargeting platform. The sizing process aims to finely tune the sensitive analog devices to be robust under PV-induced mismatch conditions, while the layout retargeting platform serves as an efficient layout synthesis tool. Moreover, a hybrid OPC process, which combines global rule-base OPC (RB-OPC) and local model-based OPC (MB-OPC) functions, is applied as a post-processing step for fixing pattern distortions in order to maximize the lithography-aware chip yield.

The present disclosure provides a method to maximize the overall chip yield, which combines a PV-aware deterministic sizing algorithm with a hybrid OPC operation, and integrates them into an analog layout migration process, which attempts to efficiently compose a layout by inheriting knowledge from a legacy layout and imposing new specifications, circuit sizing and constraints. The present method provides a sizing algorithm, which explores robust circuit sizes under different PV conditions, especially considering mismatch effects on sensitive analog devices. The analog layout migration is conducted along the sizing flow for efficient layout synthesis with a unique benefit to better evaluation of the PV-related post-layout effects. After finishing the sizing algorithm, a hybrid OPC process, which adopts global rule-based OPC and local model-based OPC, is performed as a post-processing step. Thereafter, a target mask layout is created with fast processing time, high wafer image fidelity, low mask complexity, and robust circuit performance under PV conditions. This present method provides an efficient solution to layout synthesis with respect to analog ICs by combining the deterministic sizing process with fast analog layout migration and hybrid OPC process.

Disclosed herein is a method for producing a physical layout design of an analog integrated circuit by using an existing analog layout design comprised of electronic devices of given sizes. The method comprises the steps of:

a) performing an initial analog layout retargeting operation on the existing analog layout design to produce a current ongoing retargeted analog layout design;

b) executing a process-variation simulation and one iteration of a deterministic circuit sizing process featured by a modified generalized boundary curve algorithm on the current retargeted analog layout design to generate a new set of electronic device sizes, where the deterministic circuit sizing process has termination conditions associated therewith;

c) running an analog layout retargeting operation to update the current retargeted analog layout design with the new set of electronic device sizes generated in step b);

d) iteratively executing steps b) and c) until at least one of the termination conditions of the deterministic circuit sizing process is satisfied; and e) applying one iteration of a process-variation simulation and then a hybrid optical proximity correction operation on the retargeted layout to generate a physical layout design of the finally sized analog integrated circuit, and outputting that physical layout design.

A physical layout design with a new set of device sizes may be created by each analog layout retargeting operation in step c) to precisely evaluate the circuit performance.

A worst-case corner of the current retargeted analog layout design may be estimated by a worst-linearized-circuit-performance according to a process-variation-aware wafer image simulation to guide the circuit sizing process in step b).

A modified generalized boundary curve algorithm in step b) may be used to estimate an optimal value in each generalized boundary curve exploration step by assuming that an exponential term and a quadratic term in a cost function are equal. The modified generalized boundary curve algorithm in step b) may be used to calculate a precise optimal value in each generalized boundary curve exploration step by using the estimated optimal value, and the modified generalized boundary curve algorithm in step b) may be used to guide the generalized boundary curve exploration by comparing the estimated optimal value with the calculated optimal value. In this regard it is not necessary to depend on directly changing the $\lambda$ value in the cost function, which is hard to be implemented. Instead the estimated optimal value can be readily tuned, and wherein a dichotomous strategy is applied when tuning the estimated optimal value for fast convergence and a distance value from the calculated precise optimal value on the generalized boundary curve to the origin is recorded to compensate for inaccuracy of the estimations.

A user configurable termination condition may be applied by specifying the iteration number of the deterministic sizing process to allow this deterministic circuit sizing process to jump out of a local optimal solution in step d).

The hybrid optical proximity correction process in step e) may be used to combine lithography-aware operations to improve the layout robustness with respect to lithography effects during the fabrication of integrated circuits, wherein the method comprises the steps of:

1) a global rule-based optical proximity correction process;
2) a local model-based optical proximity correction process; and
3) a process-variation-band shifting operation.

In this respect the global rule-based optical proximity correction process in step 1) applies six types of rules that are generated based on the wafer image simulation, wherein the global rule-based optical proximity correction process in step 1) applies the six types of rules in a specific order, and wherein the global rule-based optical proximity correction process in step 1) fixes any connection problems. Furthermore, the local model-based optical proximity correction process in step 2) may be performed only on local regions with outstanding lithography hotspots, which cannot be eliminated by the global rule-based optical proximity correction operation in step 1). In this respect the local model-based optical proximity correction process in step 2) separates a replacement region from the working region of the local model-based optical proximity correction process in order to smoothly combine the corrected patterns processed by the global rule-based optical proximity correction process in step 1) and the local model-based optical proximity correction process in step 2). The working region of the local model-based optical proximity correction process may be determined by extending the replacement region with one half of the optical diameter based on the optical model of the wafer image simulation.

The process-variation-band shifting operation in step 3) is focused on transistor gates to alleviate process-variation-induced mismatch effects. A number of aid features may be added for each transistor gate to shift the process-variation-band so that the original gate's edge is equidistant from the outer band and the inner band of the process-variation-band. The sizes of the aid features are created by checking a rule-based loop-up-table, which is generated based on the wafer image simulation.

The present disclosure also provides a non-transitory computer-readable media containing instructions, which when read and executed by a computer, causes the computer to execute a method for producing a physical layout design of an analog integrated circuit by using an existing analog layout design comprised of electronic devices of given sizes. The method comprises the steps of:

a) performing an initial analog layout retargeting operation on
the existing analog layout design to produce a current ongoing retargeted analog layout design;

b) executing a process-variation simulation and one iteration of a deterministic circuit sizing process featured by a modified generalized boundary curve algorithm on the current retargeted analog layout design to generate a new set of electronic device sizes, where the deterministic circuit sizing process has termination conditions associated therewith;

c) running an analog layout retargeting operation to update the current retargeted analog layout design with the new set of electronic device sizes generated in step b);

d) iteratively executing steps b) and c) until at least one of the termination conditions of the deterministic circuit sizing process is satisfied; and e) applying one iteration of a process-variation simulation and then a hybrid optical proximity correction operation on the retargeted layout to generate a physical layout design of the finally sized analog integrated circuit, and outputting that physical layout design.

The non-transitory computer-readable media is programmed with the instructions such that a physical layout design with a new set of device sizes may be created by each analog layout retargeting operation in step c) to precisely evaluate the circuit performance.

The non-transitory computer-readable media is programmed with the instructions such that a worst-case corner of the current retargeted analog layout design may be estimated by a worst-linearized-circuit-performance according to a process-variation-aware wafer image simulation to guide the circuit sizing process in step b).

The non-transitory computer-readable media is programmed with the instructions such that a modified generalized boundary curve algorithm in step b) may be used to estimate an optimal value in each generalized boundary curve exploration step by assuming that an exponential term and a quadratic term in a cost function are equal. The modified generalized boundary curve algorithm in step b) may be used to calculate a precise optimal value in each generalized boundary curve exploration step by using the estimated optimal value, and the modified generalized boundary curve algorithm in step b) may be used to guide the generalized boundary curve exploration by comparing the estimated optimal value with the calculated optimal value. In this regard it is not necessary to depend on directly changing the λ value in the cost function, which is hard to be implemented. Instead the estimated optimal value can be readily tuned, and wherein a dichotomous strategy is applied when tuning the estimated optimal value for fast convergence and a distance value from the calculated precise optimal value on the generalized boundary curve to the origin is recorded to compensate for inaccuracy of the estimations.

The non-transitory computer-readable media is programmed with the instructions such that a user configurable termination condition may be applied by specifying the iteration number of the deterministic sizing process to allow this deterministic circuit sizing process to jump out of a local optimal solution in step d).

The non-transitory computer-readable media is programmed with the instructions such that the hybrid optical proximity correction process in step e) may be used to combine lithography-aware operations to improve the layout robustness with respect to lithography effects during the fabrication of integrated circuits, wherein the method comprises the steps of:

1) a global rule-based optical proximity correction process;
2) a local model-based optical proximity correction process; and
3) a process-variation-band shifting operation.

In this respect the global rule-based optical proximity correction process in step 1) applies six types of rules that are generated based on the wafer image simulation, wherein the global rule-based optical proximity correction process in step 1) applies the six types of rules in a specific order, and wherein the global rule-based optical proximity correction process in step 1) fixes any connection problems. Furthermore, the local model-based optical proximity correction process in step 2) may be performed only on local regions with outstanding lithography hotspots, which cannot be eliminated by the global rule-based optical proximity correction operation in step 1). In this respect the local model-based optical proximity correction process in step 2) separates a replacement region from the working region of the local model-based optical proximity correction process in order to smoothly combine the corrected patterns processed by the global rule-based optical proximity correction process in step 1) and the local model-based optical proximity correction process in step 2). The working region of the local model-based optical proximity correction process may be determined by extending the replacement region with one half of the optical diameter based on the optical model of the wafer image simulation.

The non-transitory computer-readable media is programmed with the instructions such that the process-variation-band shifting operation in step 3) is focused on transistor gates to alleviate process-variation-induced mismatch effects. A number of aid features may be added for each transistor gate to shift the process-variation-band so that the original gate's edge is equidistant from the outer band and the inner band of the process-variation-band. The sizes of the aid features are created by checking a rule-based loop-up-table, which is generated based on the wafer image simulation.

The method disclosed herein is focused on an effective analog layout synthesis methodology considering lithography-related image distortion and PV-induced mismatch. This methodology reduces the time-to-market of analog IC physical design and improves overall chip yield by performing the circuit sizing process with PV considerations.

Instead of the nominal circuit performance as usual, the present deterministic sizing process uses the circuit performance in the PV-induced mismatch conditions as an optimization objective. It finds a set of robust circuit sizes, which can preserve analog circuit performance in various mismatch conditions. It can also achieve higher computation efficiency compared to any evolutionary-algorithm-based circuit sizing algorithms. As a layout synthesis tool, the analog layout migration is invoked within the deterministic sizing process. It can quickly compose physical layouts by taking into account PV-induced mismatch for better analysis of post-layout effects, and in turn improve the accuracy of the circuit sizing process.

BRIEF DESCRIPTION OF DRAWINGS

This disclosure will be more fully understood from the following detailed description thereof taken in connection with the accompanying drawings, which form part of this application, and in which:

FIG. 5A, $\lambda_1$ and $x_{opt1}$ are firstly calculated according to the initial estimation $x_{est1}$. Since $x_{opt1}$ is larger than $x_{est1}$, $\lambda_1$ should be enlarged to approach the shadow region as FIG. 5D presents. In the second iteration, as FIG. 5B shows, $\lambda_2$ should be reduced since $x_{opt2}$ is smaller than $x_{est2}$. The large exploration distance between $\lambda_1$ and $\lambda_2$ of FIG. 5D indicates that a relative large tuning range is manageable among the algorithmic iterations. By using a dichotomous tuning strategy, in this example the convergence occurs in the third iteration where $\lambda_3$ is just located inside the shadow region as FIG. 5D shows. It can be observed from FIG. 5C that $x_{opt3}$ and $x_{est3}$ are close enough to each other so that no further iteration is required.

DETAILED DESCRIPTION

Figure 1:
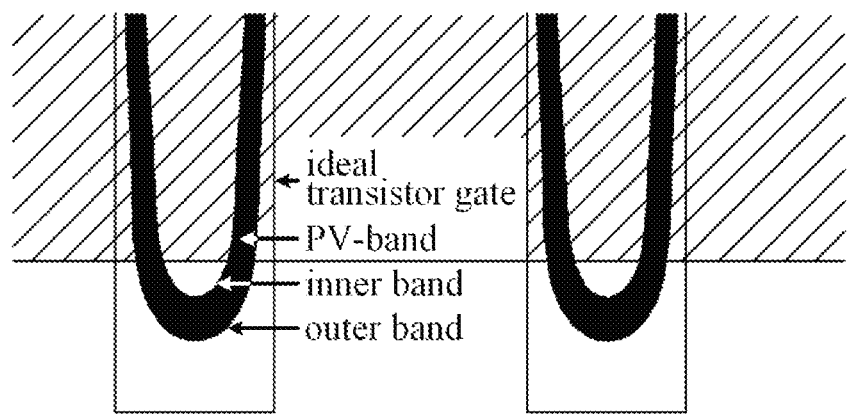
FIG. 1 presents PV simulation results with a dose range of ±2% and a defocus range of ±25 nm in 45 nm CMOS technology where the two rectangles illustrate the polysilicon gates of two adjacent transistors and the shadow area represents the corresponding active region.

The methods described herein are directed, in general, to a method for process variation-aware sizing-inclusive analog layout retargeting with optical proximity correction.

Although embodiments of the present invention are disclosed herein, the disclosed embodiments are merely exemplary and it should be understood that the invention relates to many alternative forms, including different shapes and sizes. Furthermore, the FIGs. are not drawn to scale and some features may be exaggerated or minimized to show details of particular features while related elements may have been eliminated to prevent obscuring novel aspects. Therefore, specific structural and functional details disclosed herein are not to be interpreted as limiting but merely as a basis for the claims and as a representative basis for enabling someone skilled in the art to employ the present invention in a variety of manners.

As used herein, the terms "comprises", "comprising", "includes" and "including" are to be construed as being inclusive and open ended, and not exclusive. Specifically, when used in this specification including claims, the terms "comprises", "comprising", "includes" and "including" and variations thereof mean the specified features, steps or components are included. These terms are not to be interpreted to exclude the presence of other features, steps or components.

As used herein, the terms "about" and "approximately", when used in conjunction with ranges of dimensions, compositions of mixtures or other physical properties or characteristics, is meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

As used herein, the phrase "dichotomous strategy" means when selecting a new estimated optimal value from a segment of the generalized boundary curve in each generalized boundary curve exploration step, the segment is equally partitioned into two segments, and the middle point is used as the new estimated optimal value.

The present disclosure provides a method to maximize the overall chip yield, which combines a PV-aware deterministic sizing process with a hybrid OPC operation, and integrates them into an analog layout migration platform, which attempts to efficiently compose a layout by inheriting knowledge from a legacy layout and imposing new specifications, circuit sizing and constraints. The present method provides a sizing process, which explores robust circuit sizes under different PV conditions, especially considering mismatch effects on sensitive analog devices. The analog layout migration is conducted along the sizing flow for efficient layout synthesis with a unique benefit to better evaluation of the PV-related post-layout effects. After finishing the sizing process, a hybrid OPC operation, which adopts global RB-OPC and local MB-OPC, is performed as a post-processing step. Thereafter, a target mask layout is created with fast processing time, high wafer image fidelity, low mask complexity, and robust circuit performance under PV conditions. This present method provides an efficient solution to layout synthesis with respect to analog ICs by combining the deterministic circuit sizing process with fast analog layout migration and hybrid OPC operation.

In an embodiment there is a computer implemented method for producing a physical layout design of an analog integrated circuit by using an existing analog layout design comprised of electronic devices of given sizes, wherein the method comprises the steps of:

a) performing an initial analog layout retargeting operation on the existing analog layout design to produce a current ongoing retargeted analog layout design;

b) executing a process-variation simulation and one iteration of a deterministic circuit sizing process featured by a modified generalized boundary curve algorithm on the current retargeted analog layout design to generate a new set of electronic device sizes, where the deterministic circuit sizing process has termination conditions associated therewith;

c) running an analog layout retargeting operation to update the current retargeted analog layout design with the new set of electronic device sizes generated in step b);

d) iteratively executing steps b) and c) until at least one of the termination conditions of the deterministic circuit sizing process is satisfied; and e) applying one iteration of a process-variation simulation and then a hybrid optical proximity correction operation on the retargeted layout to generate a physical layout design of the finally sized analog integrated circuit, and outputting that physical layout design.

In an embodiment a physical layout design with a new set of device sizes is created by each analog layout retargeting operation in step c) to precisely evaluate the circuit performance.

In an embodiment a worst-case corner of the current retargeted analog layout design is estimated by a worst-linearized-circuit-performance according to a process-variation-aware wafer image simulation to guide the circuit sizing process in step b).

In an embodiment the modified generalized boundary curve algorithm in step b) estimates an optimal value in each generalized boundary curve exploration step by assuming that an exponential term and an quadratic term in a cost function are equal, wherein the modified generalized boundary curve algorithm in step b) calculates a precise optimal value in each generalized boundary curve exploration step by using the estimated optimal value, and wherein the modified generalized boundary curve algorithm in step b) guides the generalized boundary curve exploration by comparing the estimated optimal value with the calculated optimal value.

In an embodiment the estimated optimal value is tuned instead of directly changing the $\lambda$ value in the cost function that is deemed less effective, and wherein a dichotomous strategy is applied when tuning the estimated optimal value for fast convergence.

In an embodiment a distance value from the calculated precise optimal value on the generalized boundary curve to the origin is recorded to compensate for inaccuracy of the estimations.

In an embodiment a user configurable termination condition is applied by specifying the iteration number of the deterministic sizing process to allow this deterministic circuit sizing process to jump out of a local optimal solution in step d).

In an embodiment the hybrid optical proximity correction in step e) combines lithography-aware operations to improve the layout robustness with respect to lithography effects during the fabrication of integrated circuits, wherein the method comprises the steps of:
1) a global rule-based optical proximity correction process;
2) a local model-based optical proximity correction process; and
3) a process-variation-band shifting operation.

In an embodiment the global rule-based optical proximity correction process in step 1) applies six types of rules that are generated based on the wafer image simulation, wherein the global rule-based optical proximity correction process in step 1) applies the six types of rules in a specific order, and wherein the global rule-based optical proximity correction process in step 1) fixes any connection problems.

In an embodiment the local model-based optical proximity correction process in step 2) is performed only on local regions with outstanding lithography hotspots, which cannot be eliminated by the global rule-based optical proximity correction operation in step 1).

In an embodiment the local model-based optical proximity correction process in step 2) separates a replacement region from the working region of the local model-based optical proximity correction process in order to smoothly combine the corrected patterns processed by the global rule-based optical proximity correction process in step 1) and the local model-based optical proximity correction process in step 2).

In an embodiment the working region of the local model-based optical proximity correction process is determined by extending the replacement region with one half of the optical diameter based on the optical model of the wafer image simulation.

In an embodiment the process-variation-band shifting operation in step 3) is focused on transistor gates to alleviate process-variation-induced mismatch effects.

In an embodiment a number of aid features are added for each transistor gate to shift the process-variation-band so that the original gate's edge is equidistant from the outer band and the inner band of the process-variation-band.

In an embodiment the sizes of the aid features are created by checking a rule-based loop-up-table, which is generated based on the wafer image simulation.

In an embodiment there is a non-transitory computer-readable media containing instructions, which when read and executed by a computer, causes the computer to execute a method for producing a physical layout design of an analog integrated circuit by using an existing analog layout design comprised of electronic devices of given sizes. The instructions provided are for
 a) performing an initial analog layout retargeting operation on the existing analog layout design to produce a current ongoing retargeted analog layout design;
 b) executing a process-variation simulation and one iteration of a deterministic circuit sizing process featured by a modified generalized boundary curve algorithm on the current retargeted analog layout design to generate a new set of electronic device sizes, where the deterministic circuit sizing process has termination conditions associated therewith;
 c) running an analog layout retargeting operation to update the current retargeted analog layout design with the new set of electronic device sizes generated in step b);
 d) iteratively executing steps b) and c) until at least one of the termination conditions of the deterministic circuit sizing process is satisfied; and
 e) applying one iteration of a process-variation simulation and then a hybrid optical proximity correction operation on the retargeted layout to generate a physical layout design of the finally sized analog integrated circuit, and outputting that physical layout design.

In an embodiment, the computer-readable media is programmed so that a physical layout design with a new set of device sizes is created by each analog layout retargeting operation in step c) to precisely evaluate the circuit performance.

In an embodiment, the computer-readable media is programmed so that a worst-case corner of the current retargeted analog layout design is estimated by a worst-linearized-circuit-performance according to a process-variation-aware wafer image simulation to guide the circuit sizing process in step b).

In an embodiment, the computer-readable media is programmed so that the modified generalized boundary curve algorithm in step b) estimates an optimal value in each generalized boundary curve exploration step by assuming that an exponential term and an quadratic term in a cost function are equal, wherein the modified generalized boundary curve algorithm in step b) calculates a precise optimal value in each generalized boundary curve exploration step by using the estimated optimal value, and wherein the modified generalized boundary curve algorithm in step b) guides the generalized boundary curve exploration by comparing the estimated optimal value with the calculated optimal value.

In an embodiment, the computer-readable media is programmed so that a user configurable termination condition is applied by specifying the iteration number of the deterministic sizing process to allow this deterministic circuit sizing process to jump out of a local optimal solution in step d).

In an embodiment, the computer-readable media is programmed so that the hybrid optical proximity correction process in step e) combines lithography-aware operations to improve the layout robustness with respect to lithography effects during the fabrication of integrated circuits, wherein the method comprises the steps of:
1) a global rule-based optical proximity correction process;
2) a local model-based optical proximity correction process; and
3) a process-variation-band shifting operation.

In an embodiment, the computer-readable media is programmed so that the estimated optimal value is tuned instead of directly changing the $\lambda$ value in the cost function that is deemed less effective, and wherein a dichotomous strategy is applied when tuning the estimated optimal value for fast convergence.

In an embodiment, the computer-readable media is programmed so that a distance value from the calculated precise optimal value on the generalized boundary curve to the origin is recorded to compensate for inaccuracy of the estimations.

In an embodiment, the computer-readable media is programmed so that the global rule-based optical proximity correction process in step 1) applies six types of rules that are generated based on the wafer image simulation, wherein the global rule-based optical proximity correction process in step 1) applies the six types of rules in a specific order, and wherein the global rule-based optical proximity correction process in step 1) fixes any connection problems.

In an embodiment, the computer-readable media is programmed so that the local model-based optical proximity correction process in step 2) is performed only on local regions with outstanding lithography hotspots, which cannot be eliminated by the global rule-based optical proximity correction operation in step 1).

In an embodiment, the computer-readable media is programmed so that the local model-based optical proximity correction process in step 2) separates a replacement region from the working region of the local model-based optical proximity correction process in order to smoothly combine the corrected patterns processed by the global rule-based optical proximity correction process in step 1) and the local model-based optical proximity correction process in step 2).

In an embodiment, the computer-readable media is programmed so that the working region of the local model-based optical proximity correction process is determined by extending the replacement region with one half of the optical diameter based on the optical model of the wafer image simulation.

In an embodiment, the computer-readable media is programmed so that the process-variation-band shifting operation in step 3) is focused on transistor gates to alleviate process-variation-induced mismatch effects.

In an embodiment, the computer-readable media is programmed so that a number of aid features are added for each transistor gate to shift the process-variation-band so that the original gate's edge is equidistant from the outer band and the inner band of the process-variation-band, and so that the sizes of the aid features are created by checking a rule-based loop-up-table, which is generated based on the wafer image simulation.

The present method will now be described in further detail.

Incorporation By Reference

The following publications, Antreich, K., Eckmueller, J., Graeb, H., Pronath, M., Schenkel, F., Schwencker R., and Zizala S. 2000. WiCkeD: Analog Circuit Synthesis Incorporating Mismatch. In *Proc. IEEE Custom Integrated Circuits Conference*, 217-220 (hereinafter Antreich et al. 2000); Schwencker, R., Schenkel, F., Graeb, H., and Antreich, K. 2000. The Generalized Boundary Curve-A Common Method for Automatic Nominal Design and Design Centering of Analog Circuits. In *Proc. Design, Automation and Test in Europe Conference and Exhibition*, 718-723 (hereinafter Schwencker et al. 2000); Liu, Z. and Zhang, L. 2010. A Performance-Constrained Template-Based Layout Retargeting Algorithm for Analog Integrated Circuits. In *Proc. 15th Asia and South Pacific Design Automation Conference*, 293-298 (hereinafter Liu and Zhang 2010); and Pornbacher, F. 1989. A New Method Supporting the Nominal Design of Analog Integrated Circuits with Regard to Constraints. In *Proc. European Conference on Circuit Theory and Design*, 614-618 (hereinafter Pornbacher 1989); and Ma, X. and Arce, G. R. 2010. *Computational Lithography*, John Wiley & Sons, Inc., Hoboken, N.J. (hereinafter Ma and Arce 2010); and Fakhry, M., Maaty, H., and Seoud, A. 2009. Introducing Process Variability Score for Process Window OPC. In *Proc. SPIE* 7488, 748836 (hereinafter Fakhry et al. 2009) are each incorporated herein by reference in their entirety.

PV-Band Induced Mismatch

FIG. 1 presents PV simulation results with a dose range of ±2% and a defocus range of ±25 nm in 45 nm CMOS technology. The two rectangles illustrate the polysilicon gates of two adjacent transistors and the shadow area represents the corresponding active region. As FIG. 1 shows, the inner band and the outer band depict the possible ranges of the wafer image, which is defined as PV-band. For each transistor gate, its width or length may randomly vary in the range defined by the PV-band. If the two transistors are used in a sensitive analog block, such as a current mirror or differential pair, in the worst case a significant mismatch can be found because one gate falls into the minimum gate dimension corresponding to the inner band and the other goes to the maximum gate dimension as the outer band. Consequently, the circuit performance might be seriously affected. For instance, after applying the worst-case PV-band on a differential pair as a quick experiment, 1.2 dB voltage gain reduction can be observed in an operational amplifier (opamp) where such a differential pair is used as the entry device for input signals.

Deterministic Sizing

According to [Antreich et al. 2000; Schwencker et al. 2000], the sizing process can be described as follows, where n represents the iteration index and i refers to the $i^{th}$ performance of a circuit.

Step 1. Start with an initial set of device sizes $s_n$, such as a set of transistor widths and lengths, which are design parameters.

Step 2. Linearize circuit performance $f_i$ with respect to design parameters $s_n$:

$$f_i(s) = f_i(s_n) + \nabla_s f_i \cdot (s - s_n), \quad (1)$$

where $\nabla_{sfi}$ represents the performance gradient.

Step 3. Determine the worst-case process corner $P_{wc}$ and calculate parameter distance $d_i(s_n)$, which is defined as the minimum deviation of $s_n$ that is needed to shift $f_{i,Pwc}(s_n)$ to the constant specification $f_{i,spec}$. According to the linear approximations in Step 2, $d_i(s_n)$ can be derived as:

$$d_i(s_n) = (f_{i,Pwc}(s_n) - f_{i,spec}) / \|\nabla_s f_i\|, \quad (2)$$

where $\|\nabla_{sfi}\|$ represents the Euclidean norm of $\nabla_{sfi}$. With reference to a given $s_n$, a general expression of parameter distance $d_i(s)$ can be linearized as:

$$d_i(s) = d_i(s_n) + g_{s,i} \cdot (s - s_n), \quad (3)$$

where $g_{s,i}$ represents the gradient of parameter distance with respect to s.

Step 4. To make the sizing robust in the worst-case process corner, the parameter distance $d_i(s_{n+1})$ should be maximized, while the size change $\Delta s = s_{n+1} - s_n$ should not exceed the linear approximation limit. For simplification, x will be used instead of $\Delta s$ thereafter in this document. Maximizing $d_i(s_{n+1})$ can be solved by a GBC algorithm, which applies the following cost function:

$$\text{minimize} \sum_i \exp^2(-\alpha \cdot d_i(x)) + \lambda \cdot \|x\|^2, \lambda \geq 0, \quad (4)$$

where factor $\alpha$ is a positive constant for scaling purpose and variable $\lambda$ controls the weight of the squared Euclidean norm of x.

Step 5. Find $s_{n+1}$ by solving (4) with the GBC algorithm, which can determine $\lambda$ and x in a mathematical way.

Step 6. Check terminating conditions. If such conditions are not satisfied, loop back to Step 2 for the next iteration.

For our presented PV-aware circuit sizing process, the mismatch effects induced by PV-band will be applied to determine the worst-case process corners in Step 3, as detailed in section below entitled PV Considerations.

Generalized Boundary Curve (GBC)

Figure 2:
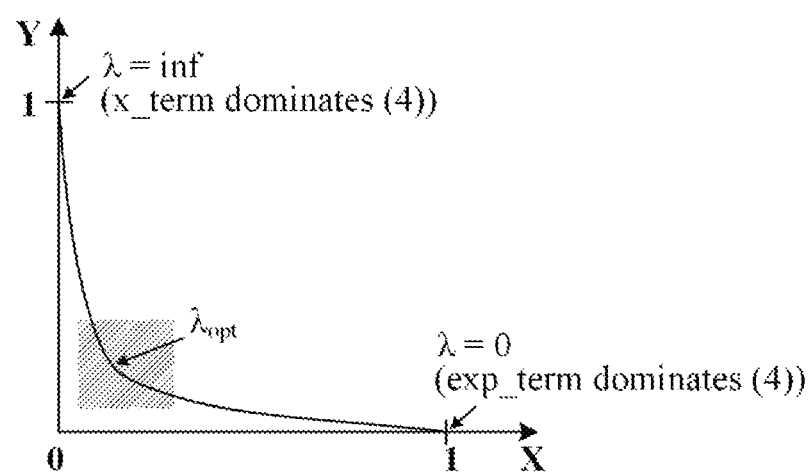
FIG. 2 shows a boundary curve example using a generalized boundary curve (GBC) algorithm disclosed by Schwencker et al. 2000).

As the section entitled Deterministic Sizing above describes, in Step 5 the updated size $s_{n+1}$ is calculated by using a GBC algorithm originally developed in [Schwencker et al. 2000]. To solve the minimization problem in (4), as FIG. 2 depicts, a typical boundary curve is plotted based on (4) by sweeping $\lambda$. The X axis and Y axis are transformed between 0 and 1 to represent the normalized size change amount and the normalized objective improvement, respectively. The objective in our proposed sizing process is to maximize the PV-aware worst-case parameter distance. When $\lambda$ is infinite, according to (4), the size change has to be 0 in order to minimize the cost function, and thus there is no improvement for the objective performance. When $\lambda$ is 0, the size change can be as large as possible. In such a situation, the objective may be greatly improved, although a large error might be experienced due to the linear approximation already laid down in the section entitled Deterministic Sizing described above. As disclosed in [Schwencker et al. 2000], an optimal point is located somewhere in the shadow region of FIG. 2, where the circuit sizes could be reasonably updated while effectively improving the objective with a significant error reduction. More details on searching for the optimal point have been discussed in the section entitled Deterministic Sizing described above of this disclosure.

Analog Layout Retargeting

Figure 3:
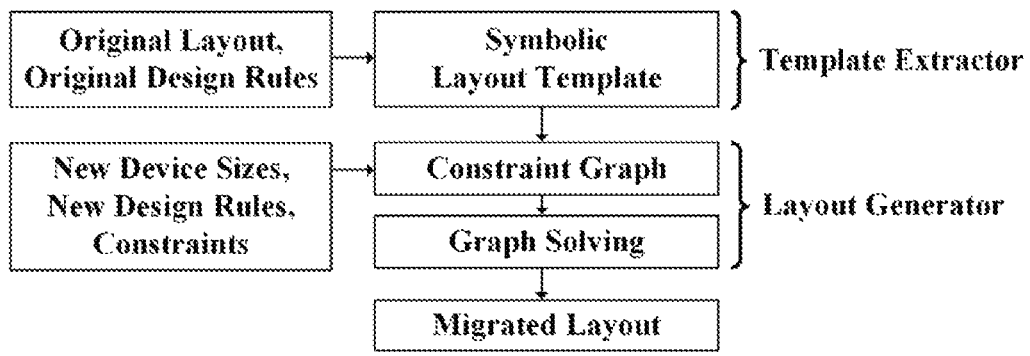
FIG. 3 is a flow chart showing a graph-based analog layout retargeting flow as disclosed by Liu and Zhang 2010].

As [Liu and Zhang 2010] proposed, a conventional graph-based analog layout retargeting flow is shown in FIG. 3. By analyzing the input legacy layout, a symbolic template is firstly constructed by the template extractor to preserve the layout topology. Afterwards, the layout generator converts the template into a constraint graph, which not only inherits knowledge from the legacy layout, but also facilitates the applications of new device sizes, new design rules and additional analog constraints (e.g., symmetry and matching constraints). The migrated layout is then created by solving the constraint graph with any longest path algorithm.

Present Design Methodology

Figure 4:
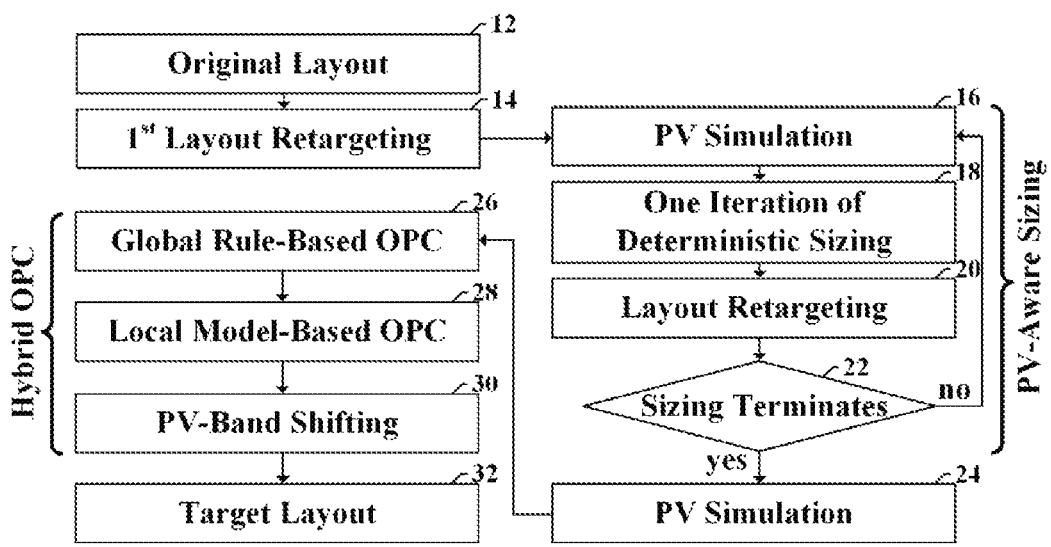
FIG. 4 illustrates a method for PV-aware sizing-inclusive analog layout retargeting platform with the hybrid OPC according to the present disclosure.
Figure 5A:
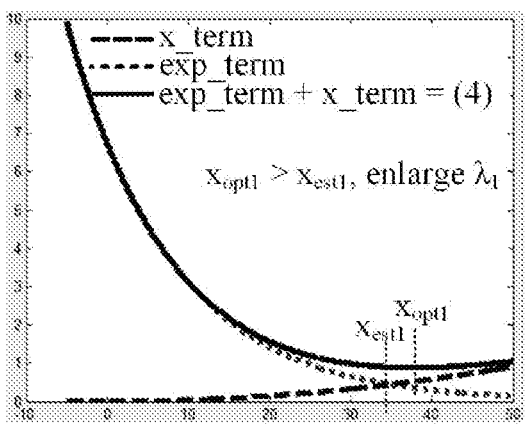
FIG. 5A to FIG. 5D illustrate an exemplary process of tuning λ based on the relative positions of $x_{est}$ and $x_{opt}$, where the cross point of the exp_term and x_term curves represents the estimated value $x_{est}$, and the corresponding $\lambda_{opt}$ and $x_{opt}$ are calculated according to (7) and (4), respectively.
Figure 5B:
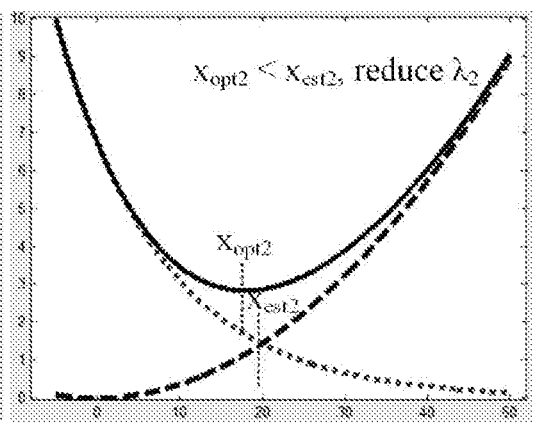
Figure 5C:
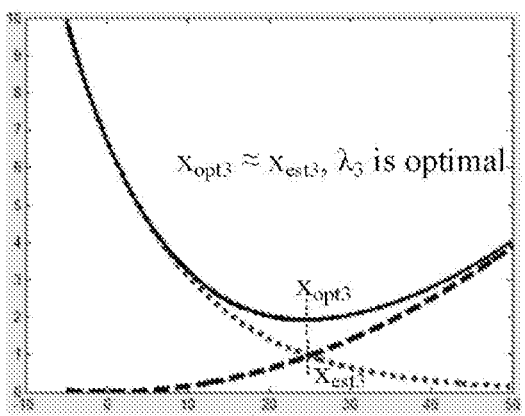
Figure 5D:
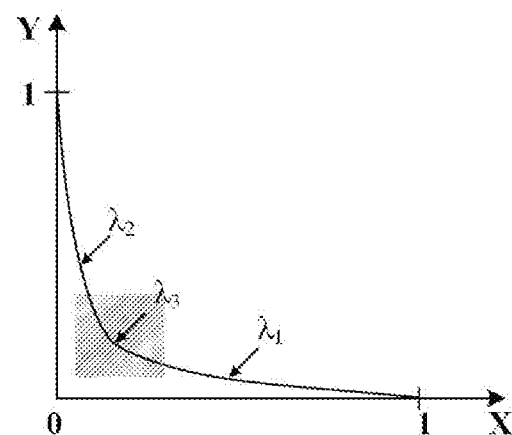

FIG. 4 is a flow diagram showing the present PV-aware sizing-inclusive analog layout retargeting platform with hybrid OPC. A detailed list of input/function/output of each step in FIG. 4 is presented below:

Step 12:
Input: a layout in any format and technology
Function: convert the input layout to a Caltech Intermediate Form (CIF) layout and prepare the corresponding original design rule file, a new design rule file, new device sizes, and user-defined constraints
Output: a layout in CIF, an original design rule file corresponding to the technology of the CIF layout, a new design rule file, new device sizes, and user-defined constraints Step 14:
Input: the CIF layout, original design rule file, new design rule file, new device sizes, and user-defined constraints generated in Step 12
Function: perform layout retargeting on the input layout and create a retargeted layout
Output: a retargeted layout Step 16:
Input: the retargeted layout generated in Step 14 or in Step 20
Function: perform PV simulation on the input layout and create a PV simulation report containing PV-band information
Output: a PV simulation report Step 18:
Input: the same retargeted layout as the input layout of Step 16, and the PV simulation report generated in Step 16
Function: perform one iteration of the deterministic sizing process to create a set of device sizes
Output: a set of device sizes Step 20:
Input: the same retargeted layout as the input layout of Step 16, the same original design rule file, new design rule file, and user-defined constraints as the inputs of Step 14, and the device sizes generated in Step 18
Function: perform layout retargeting on the input layout and create a retargeted layout
Output: a retargeted layout Step 22:
Input: the retargeted layout generated in Step 20
Function: evaluate the termination conditions of the deterministic sizing process, and generate "yes" if at least one termination conditions is satisfied, otherwise "no"
Output: "yes" or "no"

Step 24:
Input: the retargeted layout generated in Step 20
Function: perform PV simulation on the input layout and create a PV simulation report containing PV-band information
Output: a PV simulation report Step 26:
Input: the retargeted layout generated in Step 20, and the PV simulation report generated in Step 24
Function: perform global RB-OPC operation on the input layout with the help of the input PV simulation report and create a RB-OPC-processed layout
Output: a RB-OPC-processed layout Step 28:
Input: the RB-OPC-processed layout generated in Step 26
Function: perform local MB-OPC operation on the input layout and create a MB-OPC-processed layout
Output: a MB-OPC-processed layout Step 30:
Input: the MB-OPC-processed layout generated in Step 28
Function: perform PV-band shifting operation on the input layout and create a target layout
Output: a target layout Step 32:
Input: the target layout generated in Step 30
Function: prepare the final layout as the output of the whole methodology
Output: a final layout As can be seen from FIG. 4, an original layout in CIF is firstly prepared in Step 12. Together with the original layout, as FIG. 3 shows, original/new design rule files, new device sizes, and user-defined constraints are composed for the upcoming analog layout retargeting in Step 14. Afterwards, the layout retargeting process in Step 14 conducts an initial analog layout retargeting operation and creates a retargeted layout as its output. During the PV-aware sizing process in Steps 16-22, Step 16 performs a PV simulation on the retargeted layout, which is either generated by Step 14 as an initial retargeted layout, or created by Step 20 if the termination conditions are not satisfied in Step 22.

A PV simulation report containing PV-band information is then produced as the output of Step 16. By using the retargeted layout as well as the PV simulation report for the worst-case corner estimation, one iteration of the deterministic sizing process is executed in Step 18, which outputs a new set of device sizes. Then in Step 20, with the new set of device sizes, and the same original/new design rule files as well as the user-defined constraints as those in Step 14, a layout retargeting process is applied on the previously retargeted layout, which is the same as the input layout of Step 16. The output of Step 20 is a newly retargeted layout, which is used to evaluate the termination conditions in Step 22. If at least one termination conditions is satisfied in Step 22, the PV-aware sizing process terminates. Otherwise, the PV simulation in Step 16 is performed again to start the next iteration of the PV-aware sizing process.

Once the PV-aware sizing process in Steps 16-22 terminates, a PV simulation is conducted in Step 24 on the newly synthesized retargeted layout, which is defined as the resized layout, to derive a final PV simulation report. Subsequently, the resized layout and the final PV simulation report are processed by a hybrid OPC operation in Steps 26-30, which combines the global RB-OPC with local MB-OPC functions and then applies a PV-band shifting operation for mismatch handling as a post-processing step. During the hybrid OPC process, Step 26 accepts the resized layout and final PV simulation report as inputs, and generates a RB-OPC-processed layout as output by performing the global RB-OPC operation. Step 27 further polishes the RB-OPC-processed layout by the local MB-OPC operation, and then creates a MB-OPC-processed layout. Finally in Step 30, the PV-band shifting process finely corrects the MB-OPC-processed layout by using the PV-band information in the final PV simulation report. The output of Step 30 is the target layout in Step 32, which is the final output of our proposed methodology.

Because the circuit sizing process is deterministic, only one layout is synthesized each time in the PV-aware sizing iteration. Therefore, compared to the EA-based sizing algorithms, our proposed method can significantly improve the operational efficiency when such post-layout effects are considered. Moreover, in the conventional analog layout retargeting flow as shown in FIG. 3, the new device sizes are always assumed to be already available as a set of fine-tuned ones, which can guarantee the good correspondence between the migrated layout and satisfactory circuit performance. By adding this sizing process into the layout synthesis flow, such a restriction is actually relaxed. As long as the pre-layout circuit performance is close to the required specification, the layout created by the first retargeting stage in FIG. 4 would be treated as a good initial sizing point for the PV-aware sizing process. In addition, the sizing process can be accelerated in comparison to the EA-based methods since the number of iterations might be significantly reduced.

PV-Aware Deterministic Sizing Process

On top of the deterministic sizing process as described in the section entitled Deterministic Sizing described above, the present inventors introduce the PV considerations to estimate the worst-case process corner $P_{wc}$ in (2), and propose a modified GBC exploration algorithm to enhance the minimization problem solving in (4). Since the PV-band information presents the possible wafer image range for all of the process conditions, the present circuit sizing process is expected to find a set of robust circuit sizes against PV-induced mismatch effects for the best circuit performance preservation.

PV Considerations

To estimate $P_{wc}$ in (2), a linearized approximation is made on circuit performance with respect to PV conditions. By running a series of circuit SPICE simulations, performance gradient $\nabla_{jfi}$ is calculated for each device feature j. And the worst-case corner for this feature is:

$$P_{j,wc} = \begin{cases} outerBand, & \text{if } \nabla_j f_i < 0 \\ innerBand, & \text{otherwise} \end{cases} \quad (5)$$

A negative gradient value represents performance degradation when the feature size is increased. Therefore, as (5) shows, the worst-case corner of this feature is the largest possible feature size, which is the outer PV-band. The same rationale can be applied to the positive gradient case. By calculating the worst-case process corner for each sensitive design parameter in the design parameter set $s_n$, the worst-case circuit performance $f_{i,Pwc}(s_n)$ is determined and in turn the parameter distance $d_i(s_n)$ can be computed according to (2).

During the analog layout retargeting process, a group of user-defined constraints (e.g., device symmetry or matching) are applied to the layout generation. Those constraints are not only necessary as the analog layout requirements for meeting the due electrical specifications, but also offer valuable knowledge to guide the optimization algorithms. In the present PV-aware sizing process, the device matching constraints are checked twice on analog circuit building blocks, such as current mirror, differential pair, or common-centroid structures, to ensure: 1) when estimating the worst-case corners, the matching devices must fall into the opposite extreme feature sizes according to the PV-band; and 2) after one time of iteration in the sizing process, the updated size $s_{n+1}$ must satisfy all of those constraints. The former operation guarantees the worst negative effects are introduced into the circuit performance, and the latter one helps preserve the essential analog circuit constraints. Once a conflict occurs within a device pair, the one with smaller performance gradient will be modified to comply with the rule above.

Modified GBC Exploration Algorithm

As described above in the section entitled Generalized Boundary Curve (GBC), the optimal solution point on the boundary curve is located in the shadow region of FIG. 2. According to [Pornbacher 1989], this solution point can be found by firstly plotting the curve, and then identifying the point with the smallest curvature-radius. However, a large number of mathematical calculations and approximations, i.e., deriving a group of λ values for curve plotting after solving a non-linear optimization problem [Pornbacher 1989], are required on the GBC extraction, which might lower the algorithmic efficiency.

In the PV-aware deterministic sizing method disclosed herein, a modified GBC exploration algorithm is developed and applied as described below. For the cost function (4), which is comprised of exp_term (i.e., $\Sigma \exp^2(-\alpha \cdot d_i(x))$) and x_term (i.e., $\lambda \cdot \|x\|^2$), we can understand the minimization problem as:

$$(4) \text{ is dominated by } \begin{cases} \text{exp\_term}, & \text{when } \lambda = 0 \\ \text{x\_term}, & \text{when } \lambda = \inf \end{cases} \quad (6)$$

because if λ is 0, then the x_term is 0 and the cost function completely depends on the exp_term. Similarly, if λ is infinitely large, x has to be as close as 0 to minimize (4), and therefore a small fluctuation on the x_term can greatly affect the whole cost function. These two dominating conditions can be equivalently identified on the boundary curve as FIG. 2 shows. By using (6), the problem of solving the GBC can be converted to finding an optimal λ value ($λ_{opt}$) so that neither the exp_term nor the x_term dominates the cost function in (4). Correspondingly, $\lambda_{opt}$ should be located inside the shadow region in FIG. 2, while it uniquely determines an $x_{opt}$ value, which can minimize (4).

To efficiently solve (6), we firstly estimate an optimal value of x as $x_{est}$, and assume that the exp_term is equal to the x_term at $x_{est}$, which indicates that the x_term dominates the cost function in (4) for all x<$x_{est}$ (because when x is closer to 0, $\lambda$ is closer to $\lambda$=inf on the GBC and the exp_term dominates when x>$x_{est}$. Then we calculate $\lambda_{opt}$ by using the assumption above:

$$\Sigma \exp^2(-\alpha \cdot d_i(x_{est})) = \lambda \cdot \|x_{est}\|^2 \quad (7)$$

Afterwards, the up-to-now precise optimal value $x_{opt}$ is computed by solving (4) with the fixed value $\lambda_{opt}$. If $x_{opt}$ is larger than $x_{est}$, according to our assumption above, the exp_term dominates the cost function in the interval [$x_{est}$, $x_{opt}$], which results in the deviation between $x_{est}$ and $x_{opt}$. Therefore, we should move $\lambda$ towards $\lambda$=inf, where the x_term dominates (4), for compensation. Similarly, $\lambda$ should be reduced towards $\lambda$=0 when $x_{opt}$ is smaller than $x_{est}$. Since the assumption in (7) may introduce certain errors due to the natural difference between the exponential function (i.e., the exp_term) and the quadratic function (i.e., the x_term), we further calculate the distance $dist_{opt}$ between the optimal point $x_{opt}$ on the GBC and the origin point as a golden metric. As proved by [Pornbacher 1989], the GBC is always convex, which indicates that the feasible solution points on the GBC surely have smaller distance to the origin. Thus by using the distance $dist_{opt}$, $\lambda$ is always tuned towards the correct direction to minimize any possible errors due to assumption (7). This algorithm terminates when the difference between $x_{est}$ and $x_{opt}$ is small enough.

FIG. 5 illustrates an exemplary process of tuning $\lambda$ based on the relative positions of $x_{est}$ and $x_{opt}$, where the cross point of the exp_term and x_term curves represents the estimated value $x_{est}$, and the corresponding $\lambda_{opt}$ and $x_{opt}$ are calculated according to (7) and (4), respectively. In FIG. 5(a), $\lambda_1$ and $x_{opt}$ are firstly calculated according to the initial estimation $x_{est1}$. Since $x_{opt1}$ is larger than $x_{est1}$, $\lambda_1$ should be enlarged to approach the shadow region as FIG. 5(d) presents. In the second iteration, as FIG. 5(b) shows, $\lambda_2$ should be reduced since $x_{opt2}$ is smaller than $x_{est2}$. The large exploration distance between $\lambda_1$ and $\lambda_2$ of FIG. 5(d) indicates a relative large tuning range is manageable among the algorithmic iterations. By using a dichotomous tuning strategy, in this example the convergence occurs in the third iteration where $\lambda_3$ is just located inside the shadow region as FIG. 5(d) shows. It can be observed from FIG. 5(c) that $x_{opt3}$ and $x_{est3}$ are close enough to each other so that no further iteration is required.

The presently disclosed modified GBC exploration algorithm is shown in Algorithm 1, where x represents a set of size changes and j specifies the index of iterations. In Line 2, $x_{j\_est}$ is firstly estimated as a small portion of the maximum allowable size change $x_{max}$ (i.e., m is a relatively large constant). Then in Lines 3-5, we calculate $\lambda_j$, $x_j$ and $dist_j$, which represent the candidate values for $\lambda_{opt}$, $x_{opt}$ and $dist_{opt}$, respectively. The mathematical function solving in Line 4 is performed by using SageMath [Online]. During the main loop in Lines 7-21, instead of directly changing $\lambda$, we dichotomously tune the value of $x_{est}$ based on the relative position between $x_{opt}$ and $x_{est}$, because the values of $\lambda$ are not evenly distributed on the boundary curve. Once a smaller distance is found between the new point on the GBC and the origin, the corresponding values are recorded in Line 18 as the candidate solution. When the estimated size change $x_{j\_est}$ is very close to the calculated precise size change $x_j$ within the user-defined threshold $x_{th}$, the optimization iteration terminates. According to our experiments, the sizing loop in our proposed modified GBC exploration flow usually converge within a dozen of iterations, which is favorably acceptable in terms of runtime in practice.

Algorithm 1: Modified GBC Exploration Algorithm 1. leftBoundary = 0 ; rightBoundary = $x_{max}$ ; j=0 ;
2. Estimate an initial size change $x_{j\_est}$ = $x_{max}$/ m ;
3. Calculate an initial $\lambda$ value as $\lambda_j$ by solving $\Sigma\exp^2(-\alpha \cdot d_i(x_{j\_est})) = \lambda \cdot \|x_{j\_est}\|^2$ ;
4. Calculate the accurate size change $x_j$ at $\lambda_j$ by solving
   $\min(\Sigma\exp(-\alpha \cdot d_i(x))^2 + \lambda_j \cdot \|x\|^2)$ ;
5. By using $x_j$ and $\lambda_j$, derive the corresponding point on GBC and calculate
   its distance to the origin as $dist_j$ ;
6. Record the final solution $x_{opt}$= $x_j$ ; $\lambda_{opt}$ = $\lambda_j$ ; $dist_{opt}$ = $dist_j$ ;
7. While (1)
8.    If ($\|x_j - x_{j\_est}\| < \|x_{th}\|$)
9.      break ;
10.   Else if ($x_j < x_{j\_est}$) // the x_term dominates (4)
11.      leftBoundary = $x_{j\_est}$ ; // decrease x by moving the solution space rightward
12.   Else // the exp_term dominates (4)
13.      rightBoundary = $x_{j\_est}$ ; // increase x by moving the solution space leftward
14.   End if
15.   $x_{j+1\_est}$ = (leftBoundary + rightBoundary) / 2 ; // a dichotomous strategy
16.   Calculate $\lambda_{j+1}$, $x_{j+1}$ and $dist_{j+1}$ similar to Lines 3-5, respectively ;
17.   If ($dist_{j+1} < dist_{opt}$) // a better solution point is found on GBC
18.      $x_{opt}$= $x_{j+1}$ ; $\lambda_{opt}$ = $\lambda_{j+1}$ ; $dist_{opt}$ = $dist_{j+1}$ ; // update the final solution
19.   End if
20.   j = j+1 ;
21. End while

3.3 Terminating Conditions

The terminating conditions in the PV-aware sizing process include:

$$f_{P_{wc}}(s_{n+1}) > f_{spec}, \quad (8)$$

or $$|f_{P_{wc}}(s_{n+1}) - f_{P_{wc}}(s_n)| \leq \beta, \beta > 0, \quad (9)$$

or $$f_{P_{wc}}(s_{n+1}) \& f_{P_{wc}}(s_{n+2}) \& \ldots \& f_{P_{wc}}(s_{n+\gamma}) \text{ are worse} \\ \text{than } f_{P_{wc}}(s_n) \text{ or not better than } f_{P_{wc}}(s_n) \text{ by } \beta. \quad (10)$$

Condition (8) represents that the new sizes are good enough for any worst-case performance because we assume the performance should be larger than the specification, while condition (9) denotes that the worst-case performance can hardly be further improved, which is controlled by a user-specified vector β. Each element in β is corresponding to one specific circuit performance, such as voltage gain or bandwidth of an opamp. Conditions (8) and (9) are expected in most applications since a relatively good initial sizing point is normally available at the first time of the analog layout retargeting. In this situation, the sizing scheme actually serves as a fine-tuning step to alleviate the mismatch effects for further yield improvement.

Moreover, we propose condition (10) as an additional user-configurable terminating condition. If the worst-case performance has just decreased compared to the previous iteration, the sizing process is not necessary to be terminated right away. Instead, a further user-defined number of iterations (i.e., γ more iterations in (10)) are still allowed. This feature provides a chance for our proposed sizing process to jump out of a local minimum since the analog circuit sizing is naturally a highly non-linear problem. It would be very helpful if the user: 1) suspects the initial sizing point is not reliable; 2) attempts to quickly explore the sensitivities of different initial sizing points; or 3) assumes that some design parameters are very sensitive to the mismatch effects induced by PV-band.

Hybrid OPC

After executing the PV-aware circuit sizing process, a robust physical design should be prepared for post-layout processing in order to alleviate pattern distortions. On the one hand, since the accuracy of a standalone RB-OPC approach is usually limited due to the applied rule library, it might not be able to eliminate all fatal error hotspots on the wafer image, especially those among congested layout patterns. Such hotspots can not only contribute to a significant portion of edge placement error (EPE), which represents the wafer image fidelity, but also result in functional failure in terms of circuit performance. On the other hand, the wafer image quality can be effectively improved by a standalone MB-OPC scheme. However, because of its aggressive layout pattern operations, the algorithmic efficiency might be greatly reduced. As discussed previously, a hybrid OPC scheme can achieve a sound trade-off among wafer image fidelity, mask complexity and algorithm runtime. Therefore, the present method is configured to adopt global RB-OPC scheme along with local high accuracy MB-OPC approach, where the RB-OPC is firstly used to efficiently process the whole layout and the MB-OPC is then applied to fix all the outstanding hotspots in the circuit.

Global RB-OPC

Figure 6:
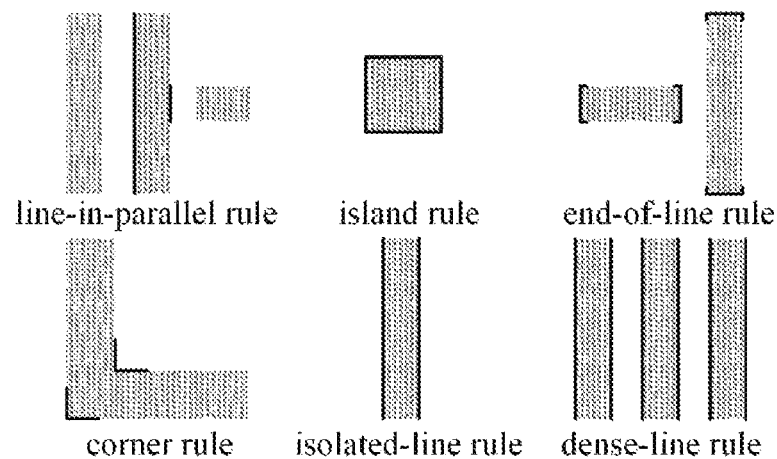
FIG. 6 depicts the application of six types of rules, (according to [Ma and Arce 2010]), in the present RB-OPC algorithm disclosed herein, namely: line-in-parallel rule, dense line rule, end-of-line rule, corner rule, island rule and isolated-line rule.

According to [Ma and Arce 2010], we apply six types of rules in our RB-OPC algorithm: line-in-parallel rule, dense-line rule, end-of-line rule, corner rule, island rule and isolated-line rule, which are depicted in FIG. 6. For each rule, a rule library is firstly generated by sweeping related geometric features and performing high-accuracy model-based image simulations. Afterwards, each pattern in the layout is checked and matched to one or more types of rules and then the original pattern is replaced by the pre-generated patterns in the rule library. During the RB-OPC process, certain rule conflicts might emerge if the six types of rules are applied in an arbitrary order. For example, the line-in-parallel rule or dense-line rule are applied according to distance and overlap length between two patterns. However, both the distance and overlap length might be changed after an end-of-line rule takes effect. Therefore, the line-in-parallel rule or dense-line rule has to be considered after the end-of-line rule.

The specific order that the six types of rules are applied includes:
i) applying an island rule and an end-of-line rule;
ii) applying a line-in-parallel rule, a dense-line rule and an isolated-line rule; and
iii) applying a corner rule.

The island rule and end-of-line rule in step i) are firstly applied because the two rules are relatively independent from the other rules so that a layout pattern processed by the two rules can be further processed by the other rules without any conflicts. The line-in-parallel rule, dense-line rule and isolated-line rule in step ii) are applied simultaneously because the three rules are complementary. Since a connection problem usually occurs at a bend of a layout pattern which is processed by the rules in step ii), the corner rule in step iii) is applied at the end of the optical proximity correction after all the connection problems are fixed so that a corner pattern can be easily identified to apply the corner rule.

Algorithm 2 describes the flow of the RB-OPC algorithm disclosed herein. In Algorithm 2, the first loop in Lines 1-7 adopts the relatively independent island rule and end-of-line rule globally, where $T_s$ restricts the size of an island pattern. In order to avoid possible rule conflicts, the second loop in Lines 8-16 is performed based on the corrected patterns from the first loop. For each of the non-island patterns in the second loop, one of the line-in-parallel rule, dense-line rule and isolated-line rule takes effect according to its surroundings. Line 17 in Algorithm 2 attempts to fix all the connection problems before applying the corner rule. This is helpful to fix any imperfections of the pattern corner conditions after applying the first five rules so that the corner rule can be smoothly adopted as the last step of our proposed rule-based OPC algorithm. Finally in the last loop of Lines 18-20, the corner rule is applied.

Algorithm 2: RB-OPC Algorithm

1. Foreach (pattern in the original layout)
2.   If (both width and length are smaller than threshold $T_s$)
3.     Apply the island rule; // relatively independent
4.   Else
5.     Apply the end-of-line rule if no connecting patterns
        are found near the line ends; // relatively independent
6.   End if
7. End for
8. Foreach (non-island pattern in the corrected layout)
9.   If (only one pattern in parallel is found)
10.     Apply the line-in-parallel rule; // the line-in-parallel rule, dense-line rule
        // and isolated-line rule are complementary Algorithm 2: RB-OPC Algorithm 11.     Else if (more than one pattern in parallel is found)
12.        Apply the dense-line rule;
13.     Else
14.        Apply the isolated-line rule;
15.     End if
16.   End for
17.   Fix all the connection problems if any exist; // fix imperfection of corners
                                                        // by the first five rules
18.   Foreach (non-island pattern in the original layout)
19.     Apply the corner rule if a corner is recognized;
20.   End for

4.2 Local MB-OPC

A global MB-OPC process may greatly increase the runtime and mask complexity, which would deviate from the objectives of our desired agile analog layout retargeting. According to [Verma et al. 2015], the runtime of the MB-OPC is roughly linear with respect to its working area in the layout. Therefore, if we only define certain regions around the remaining fatal error hotspots (i.e., the wafer image hotspots after the global RB-OPC due to its accuracy limitation) and apply the MB-OPC operation locally, sound effectiveness of the hybrid OPC scheme can be expected. On the one hand, the MB-OPC operation can eliminate all the outstanding hotspots and in turn improve the EPE. On the other hand, because of the restricted working region, the local MB-OPC process will only reasonably increase the algorithm runtime and mask complexity.

Figure 7:
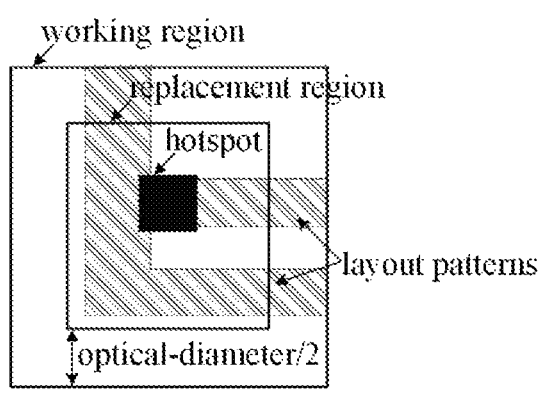
FIG. 7 shows an example of the working region where the local MB-OPC operation is applied in the present method.

FIG. 7 shows an example of the working region where the local MB-OPC operation is applied. As can be seen from FIG. 7, for each outstanding hotspot, a replacement region is firstly identified. If an edge of the replacement region overlaps with a layout pattern, this edge will be moved towards the same direction with reference to the replacement region so that it can completely cover that layout pattern. Because the replacement region indicates how much and where the patterns generated by the MB-OPC operation are actually applied to substitute those created by the RB-OPC operation, the rule above is helpful to ensure a smooth layout concatenation so that no new fatal error hotspots are introduced unexpectedly. Then by extending the replacement region with one half of the optical diameter based on the optical model of the image simulation, the working region of the local MB-OPC operation can be identified. Such an optical diameter illustrates the region of kernel convolutions when calculating the light intensity. Therefore, by executing the MB-OPC process on the working region, the corrected patterns inside the replacement region are precise and reliable.

PV-Band Shifting

Figure 8A:
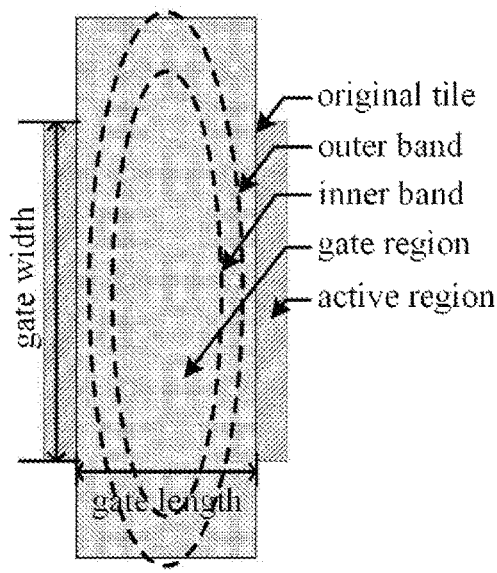
FIG. 8A illustrates the PV-band of the gate region according to a typical transistor model showing the shrinking of the inner band and outer band due to process variations, which indicates a gate length deviation.

The PV-aware deterministic sizing process disclosed herein can fundamentally enhance the circuit robustness against lithography variations. On the other hand, as shown in FIG. 8A, if without proper OPC operation, both the inner band and outer band of one regular transistor gate would shrink compared to the original gate edges. According to [Fakhry et al. 2009], a PV-band without good symmetry is less immune against process variations. A perfect symmetric PV-band should present the same distance between inner and outer bands with reference to the ideal edge. To further alleviate the deviations of circuit performance, especially caused by sensitive analog devices, we have proposed a unique scheme, named as PV-band shifting, to improve the PV-band quality.

Figure 8B:
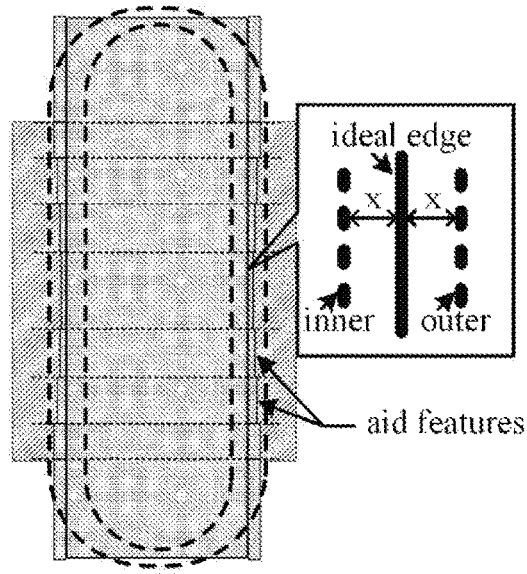
FIG. 8B illustrates a PV-band shifting scheme according to the present method, where aid features are attached to the original pattern edges so that each ideal edge is equidistant from the outer band and the inner band.

As FIG. 8B shows, a goal of the present method is to shift the PV-band so that the original pattern edge (i.e., the marked "original edge" inside the zoom-in block) is equidistant from the outer band and the inner band. As can be seen from FIG. 4, by executing a PV simulation on the migrated layout after the deterministic sizing process, we can extract the PV-band information in order to guide the PV-band shifting. During the shifting operation, as FIG. 8B depicts, we fragment the gate patterns and insert aid features for each segment according to its corresponding PV-band size. This is also a rule-based approach, through which the aid feature sizes can be quickly derived from a look-up-table. The processed PV-band would present a uniform width, and the nominal image contour, which is assumed in the middle of the PV-band, should be equivalent to the ideal transistor gate dimensions. Our proposed PV-band shifting scheme can effectively contribute to the circuit performance preservation but with much less computation effort and mask complexity compared to the pure MB-OPC operation.

It will be understood that the present method is a computer implemented method with the computer programmed with Algorithms 1 and 2 and instructions to perform all the steps in the flow charts of FIG. 2 and FIG. 4. A non-limiting exemplary computer system that may be used to implement the present method contains a central processor interfaced with a memory storage device, input/output devices and user interface(s), a power supply, an internal memory storage containing code for the various programs used to implement the present method with the computer system configured to accept the computer-readable media containing the instructions to implement the present method.

CONCLUSIONS

In the present disclosure, a PV-aware sizing-inclusive analog layout retargeting methodology embedded with hybrid OPC operations for yield improvement has been disclosed. By using the efficient analog layout retargeting process as a layout synthesis approach, the lithography-aware PV-induced effects are considered in a deterministic circuit sizing process enhanced by our modified GBC exploration algorithm. Moreover, a hybrid OPC scheme, which combines global RB-OPC and local MB-OPC operations, is applied to alleviate pattern distortions with a sound trade-off among EPE, mask complexity and algorithm runtime. During the hybrid OPC handling, a PV-band shifting operation is performed for better preservation of circuit performance under PV-induced mismatch conditions.

The foregoing description of the preferred embodiments of the disclosure has been presented to illustrate the principles of the disclosure and not to limit the disclosure to the particular embodiment illustrated. It is intended that the scope of the disclosure be defined by all of the embodiments encompassed within the following claims and their equivalents.

REFERENCES

Antreich, K., Eckmueller, J., Graeb, H., Pronath, M., Schenkel, F., Schwencker R., and Zizala S. 2000. WiCkeD: Analog Circuit Synthesis Incorporating Mismatch. In *Proc. IEEE Custom Integrated Circuits Conference*, 217-220.

Fakhry, M., Maaty, H., and Seoud, A. 2009. Introducing Process Variability Score for Process Window OPC. In *Proc. SPIE* 7488, 748836.

Liu, Z. and Zhang, L. 2010. A Performance-Constrained Template-Based Layout Retargeting Algorithm for Analog Integrated Circuits. In *Proc. 15th Asia and South Pacific Design Automation Conference*, 293-298.

Ma, X. and Arce, G. R. 2010. *Computational Lithography*, John Wiley & Sons, Inc., Hoboken, N.J.

Pornbacher, F. 1989. A New Method Supporting the Nominal Design of Analog Integrated Circuits with Regard to Constraints. In *Proc. European Conference on Circuit Theory and Design*, 614-618.

SageMath, Online. SageMath: Creating a Viable Free Open Source Alternative to Magma, Maple, Mathematica and Matlab. Available: https://www.sagemath.org Schwencker, R., Schenkel, F., Graeb, H., and Antreich, K. 2000. The Generalized Boundary Curve-A Common Method for Automatic Nominal Design and Design Centering of Analog Circuits. In *Proc. Design, Automation and Test in Europe Conference and Exhibition*, 718-723.

Su, Y. H., Huang, Y. C., Tsai, L. C., Chang, Y. W., and Banerjee, S. 2016. Fast Lithographic Mask Optimization Considering Process Variation. *IEEE Transactions on Computer-Aided Design of Integrated Circuits and Systems* 35, 8, 1345-1357.

Verma, P., Somani, S., Ping, Y. Y., Pathak, P., Ghaida, R. S., Babcock, C. P., Batarseh, F., Wang, J., Madhavan, S., and McGowan, S. 2015. Hybrid OPC Flow with Pattern Search and Replacement. In *Proc. SPIE* 9426. doi: 10.1117/12.2087094.

Therefore what is claimed is:

1. A method for producing a physical layout design of an analog integrated circuit by using an existing analog layout design comprised of electronic devices of given sizes, wherein the method comprises the steps of:
   a) performing an initial analog layout retargeting operation on the existing analog layout design to produce a current ongoing retargeted analog layout design;
   b) executing a process-variation simulation and one iteration of a deterministic circuit sizing process featured by a modified generalized boundary curve algorithm on the current retargeted analog layout design to generate a new set of electronic device sizes, where the deterministic circuit sizing process has termination conditions associated therewith;
   c) running an analog layout retargeting operation to update the current retargeted analog layout design with the new set of electronic device sizes generated in step b);
   d) iteratively executing steps b) and c) until at least one of the termination conditions of the deterministic circuit sizing process is satisfied; and
   e) applying one iteration of a process-variation simulation and then a hybrid optical proximity correction operation on the retargeted layout to generate a physical layout design of the finally sized analog integrated circuit, and outputting that physical layout design.

2. The method in accordance with claim 1, wherein a physical layout design with a new set of device sizes is created by each analog layout retargeting operation in step c) to precisely evaluate the circuit performance.

3. The method in accordance with claim 1, wherein a worst-case corner of the current retargeted analog layout design is estimated by a worst-linearized-circuit-performance according to a process-variation-aware wafer image simulation to guide the circuit sizing process in step b).

4. The method in accordance with claim 1, wherein the modified generalized boundary curve algorithm in step b) estimates an optimal value in each generalized boundary curve exploration step by assuming that an exponential term and an quadratic term in a cost function are equal, wherein the modified generalized boundary curve algorithm in step b) calculates a precise optimal value in each generalized boundary curve exploration step by using the estimated optimal value, and wherein the modified generalized boundary curve algorithm in step b) guides the generalized boundary curve exploration by comparing the estimated optimal value with the calculated optimal value.

5. The method in accordance with claim 1 wherein a user configurable termination condition is applied by specifying the iteration number of the deterministic sizing process to allow this deterministic circuit sizing process to jump out of a local optimal solution in step d).

6. The method in accordance with claim 1, wherein the hybrid optical proximity correction process in step e) combines lithography-aware operations to improve the layout robustness with respect to lithography effects during the fabrication of integrated circuits, wherein the method comprises the steps of:
   1) a global rule-based optical proximity correction process;
   2) a local model-based optical proximity correction process; and
   3) a process-variation-band shifting operation.

7. The method in accordance with claim 4, wherein the estimated optimal value is tuned instead of directly changing the $\lambda$ value in the cost function that is deemed less effective, and wherein a dichotomous strategy is applied when tuning the estimated optimal value for fast convergence.

8. The method in accordance with claim 4 wherein a distance value from the calculated precise optimal value on the generalized boundary curve to the origin is recorded to compensate for inaccuracy of the estimations.

9. The method in accordance with claim 6 wherein the global rule-based optical proximity correction process in step 1) applies six types of rules that are generated based on the wafer image simulation, wherein the global rule-based optical proximity correction process in step 1) applies the six types of rules in a specific order, and wherein the global rule-based optical proximity correction process in step 1) fixes any connection problems.

10. The method in accordance with claim 6 wherein the local model-based optical proximity correction process in step 2) is performed only on local regions with outstanding lithography hotspots, which cannot be eliminated by the global rule-based optical proximity correction operation in step 1).

11. The method in accordance with claim 6 wherein the local model-based optical proximity correction process in step 2) separates a replacement region from the working region of the local model-based optical proximity correction process in order to smoothly combine the corrected patterns processed by the global rule-based optical proximity correction process in step 1) and the local model-based optical proximity correction process in step 2).

12. The method in accordance with claim 11 wherein the working region of the local model-based optical proximity correction process is determined by extending the replacement region with one half of the optical diameter based on the optical model of the wafer image simulation.

13. The method in accordance with claim 6 wherein the process-variation-band shifting operation in step 3) is focused on transistor gates to alleviate process-variation-induced mismatch effects.

14. The method in accordance with claim 13 wherein a number of aid features are added for each transistor gate to shift the process-variation-band so that the original gate's edge is equidistant from the outer band and the inner band of the process-variation-band.

15. The method in accordance with claim 14 wherein the sizes of the aid features are created by checking a rule-based loop-up-table, which is generated based on the wafer image simulation.

16. A non-transitory computer-readable media containing instructions, which when read and executed by a computer, causes the computer to execute a method for producing a physical layout design of an analog integrated circuit by using an existing analog layout design comprised of electronic devices of given sizes, wherein the method comprises the steps of:
    a) performing an initial analog layout retargeting operation on the existing analog layout design to produce a current ongoing retargeted analog layout design;
    b) executing a process-variation simulation and one iteration of a deterministic circuit sizing process featured by a modified generalized boundary curve algorithm on the current retargeted analog layout design to generate a new set of electronic device sizes, where the deterministic circuit sizing process has termination conditions associated therewith;
    c) running an analog layout retargeting operation to update the current retargeted analog layout design with the new set of electronic device sizes generated in step b);
    d) iteratively executing steps b) and c) until at least one of the termination conditions of the deterministic circuit sizing process is satisfied; and
    e) applying one iteration of a process-variation simulation and then a hybrid optical proximity correction operation on the retargeted layout to generate a physical layout design of the finally sized analog integrated circuit, and outputting that physical layout design.

17. The computer-readable media in accordance with claim 16 wherein a physical layout design with a new set of device sizes is created by each analog layout retargeting operation in step c) to precisely evaluate the circuit performance.

18. The computer-readable media in accordance with claim 16, wherein a worst-case corner of the current retargeted analog layout design is estimated by a worst-linearized-circuit-performance according to a process-variation-aware wafer image simulation to guide the circuit sizing process in step b).

19. The computer-readable media in accordance with claim 16, wherein the modified generalized boundary curve algorithm in step b) estimates an optimal value in each generalized boundary curve exploration step by assuming that an exponential term and an quadratic term in a cost function are equal, wherein the modified generalized boundary curve algorithm in step b) calculates a precise optimal value in each generalized boundary curve exploration step by using the estimated optimal value, and wherein the modified generalized boundary curve algorithm in step b) guides the generalized boundary curve exploration by comparing the estimated optimal value with the calculated optimal value.

20. The computer-readable media in accordance with claim 16, wherein a user configurable termination condition is applied by specifying the iteration number of the deterministic sizing process to allow this deterministic circuit sizing process to jump out of a local optimal solution in step d).

21. The computer-readable media in accordance with claim 16, wherein the hybrid optical proximity correction process in step e) combines lithography-aware operations to improve the layout robustness with respect to lithography effects during the fabrication of integrated circuits, wherein the method comprises the steps of:
    1) a global rule-based optical proximity correction process;
    2) a local model-based optical proximity correction process; and
    3) a process-variation-band shifting operation.

22. The computer-readable media in accordance with claim 19, wherein the estimated optimal value is tuned instead of directly changing the $\lambda$ value in the cost function that is deemed less effective, and wherein a dichotomous strategy is applied when tuning the estimated optimal value for fast convergence.

23. The computer-readable media in accordance with claim 19 wherein a distance value from the calculated precise optimal value on the generalized boundary curve to the origin is recorded to compensate for inaccuracy of the estimations.

24. The computer-readable media in accordance with claim 21 wherein the global rule-based optical proximity correction process in step 1) applies six types of rules that are generated based on the wafer image simulation, wherein the global rule-based optical proximity correction process in step 1) applies the six types of rules in a specific order, and wherein the global rule-based optical proximity correction process in step 1) fixes any connection problems.

25. The computer-readable media in accordance with claim 21 wherein the local model-based optical proximity correction process in step 2) is performed only on local regions with outstanding lithography hotspots, which cannot be eliminated by the global rule-based optical proximity correction operation in step 1).

26. The computer-readable media in accordance with claim 21 wherein the local model-based optical proximity correction process in step 2) separates a replacement region from the working region of the local model-based optical proximity correction process in order to smoothly combine the corrected patterns processed by the global rule-based optical proximity correction process in step 1) and the local model-based optical proximity correction process in step 2).

27. The computer-readable media in accordance with claim 26 wherein the working region of the local model-based optical proximity correction process is determined by extending the replacement region with one half of the optical diameter based on the optical model of the wafer image simulation.

28. The computer-readable media in accordance with claim 21 wherein the process-variation-band shifting operation in step 3) is focused on transistor gates to alleviate process-variation-induced mismatch effects.

29. The computer-readable media in accordance with claim 28 wherein a number of aid features are added for each transistor gate to shift the process-variation-band so that the original gate's edge is equidistant from the outer band and the inner band of the process-variation-band.

30. The computer-readable media in accordance with claim 29 wherein the sizes of the aid features are created by checking a rule-based loop-up-table, which is generated based on the wafer image simulation.

* * * * *